United States Patent
Hiles

(10) Patent No.: US 7,881,749 B2
(45) Date of Patent: Feb. 1, 2011

(54) MOBILE COMMUNICATION DEVICE AND METHOD FOR CONTROLLING COMPONENT ACTIVATION BASED ON SENSED MOTION

(75) Inventor: Paul E. Hiles, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 868 days.

(21) Appl. No.: 11/528,957

(22) Filed: Sep. 28, 2006

(65) Prior Publication Data

US 2008/0081656 A1    Apr. 3, 2008

(51) Int. Cl.
*H04M 1/00* (2006.01)

(52) U.S. Cl. .............. 455/556.1; 455/127.5; 455/550.1; 370/318

(58) Field of Classification Search .............. 455/404.1, 455/404.2, 456.1, 550.1, 556.1, 127.5; 370/318
See application file for complete search history.

(56) References Cited

U.S. PATENT DOCUMENTS

| | | |
|---|---|---|
| 5,568,367 A | 10/1996 | Park |
| 5,586,182 A | 12/1996 | Miyashita |
| 5,705,997 A | 1/1998 | Park |
| 5,953,677 A | 9/1999 | Sato |
| 6,002,450 A | 12/1999 | Darbee et al. |
| 6,346,891 B1 | 2/2002 | Feinleib et al. |
| 6,501,420 B2 | 12/2002 | Townsend et al. |
| 6,549,792 B1 | 4/2003 | Cannon et al. |
| 6,700,493 B1 | 3/2004 | Robinson |
| 6,903,655 B2 | 6/2005 | Stefanik |
| 7,010,332 B1 | 3/2006 | Irvin et al. |
| 2002/0158999 A1 | 10/2002 | Shima |
| 2002/0177476 A1* | 11/2002 | Chou ......................... 455/574 |
| 2004/0192269 A1* | 9/2004 | Hill ......................... 455/414.1 |
| 2005/0212749 A1* | 9/2005 | Marvit et al. ............... 345/156 |
| 2005/0222801 A1* | 10/2005 | Wulff et al. ................. 702/141 |
| 2006/0119508 A1* | 6/2006 | Miller .................... 342/357.17 |
| 2006/0240866 A1* | 10/2006 | Eilts ........................ 455/556.1 |
| 2008/0174550 A1* | 7/2008 | Laurila et al. ............... 345/158 |

* cited by examiner

*Primary Examiner*—Nick Corsaro
*Assistant Examiner*—Chuong A Ngo

(57) ABSTRACT

A mobile communication device in accordance with an exemplary embodiment comprises a transceiver, a motion sensor, and logic. The transceiver is configured to communicate wireless signals. The logic is configured to perform a comparison of data from the motion sensor to data indicative of an expected flight path of the mobile communication device and to control an activation state of at least one component based on the comparison.

14 Claims, 4 Drawing Sheets

MOBILE COMMUNICATION DEVICE AND METHOD FOR CONTROLLING COMPONENT ACTIVATION BASED ON SENSED MOTION

RELATED ART

In many wireless communication systems, such as Wi-Fi, a mobile communication device communicates with an access point that provides the mobile communication device access to a wide area network (WAN), such as the Internet. The region in which the communication device can successfully communicate with an access point is referred to as a "hotspot." During operation, each access point periodically transmits a beacon that identifies the transmitting access point, and the mobile communication device continuously listens for such beacons to identify a suitable access point with which to communicate.

In some instances, the mobile communication device is not within a hotspot or, in other words, is outside of the communication range of any access point. In such a case, the mobile communication device is usually unable to communicate with the WAN but continues to listen for access point beacons in case the device comes within range of an access point.

If the mobile communication device enters a hotspot and detects a beacon from an access point, the mobile communication device records the access point's identifier from the beacon. Thereafter, when the mobile communication device is to transmit a message, the device packetizes the message into one or more digital packets and inserts the access point identifier into the header of each packet. A transceiver within the mobile communication device then wirelessly transmits each packet. The identified access point receives each packet and interfaces these packets with the WAN, which communicates the packets to their ultimate destination. If the mobile communication device stops receiving the periodic beacon from the access point, then the device is aware that it is no longer within the hotspot and does not attempt to transmit any packets unless it is able to detect beacon(s) from another access point.

Since mobile communication devices are designed to be carried or otherwise transported over great distances, many mobile communication devices employ a battery to provide electrical power to the components of the device. Thus, the amount of available power is limited. Indeed, over time, the battery may wear down to an extent such that the mobile communication device is unable to communicate until the battery is replaced or recharged. To increase battery life, various techniques have been employed to reduce the power requirements of mobile communication devices. However, further reducing the power requirements of mobile communication devices is generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to communication systems having mobile communication devices that search for access points to gain access to a network. In one exemplary embodiment, a mobile communication device deactivates various components, such as the logic for finding an access point, until the device determines that sending of a message is imminent (e.g., a user is ready to use the device to transmit a message). When the mobile communication device detects that sending of a message is imminent, the device automatically wakes up the deactivated components. Thus, the mobile communication device begins searching for an access point so that the device can transmit the expected message. By deactivating various components until the detection of an imminent message, electrical power is conserved.

Figure 1:
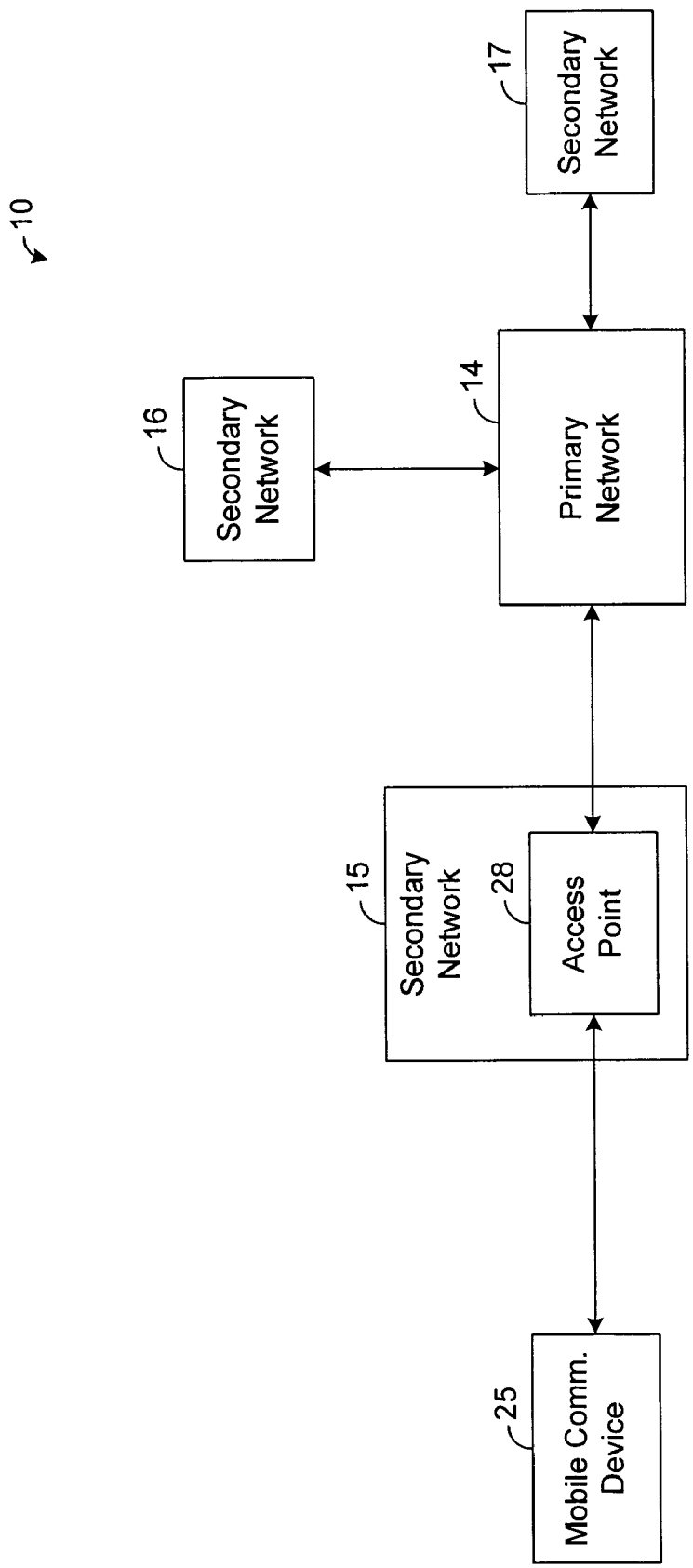
FIG. 1 is a block diagram illustrating an exemplary embodiment of a communication system in accordance with the present disclosure.

FIG. 1 depicts a communication system 10 in accordance with an exemplary embodiment of the present disclosure. The system 10 of FIG. 1 comprises a primary network 14 and a plurality of secondary networks 15-17 that are interfaced with the primary network 14. Any user communication device communicatively coupled to any of the networks 14-17 can communicate over such networks 14-17. For simplicity, FIG. 1 shows one such device 25, which is a mobile device that communicates via wireless signals. However, the system 10 may include any number of user communications devices.

For simplicity, FIG. 1 shows three secondary networks 15-17, but the system 10 may comprise any number of secondary networks in other embodiments. The network 14 is "primary" in the sense that each of the secondary networks 15-17 of the system 10 communicates over the primary network 14 in order to communicate with any of the other secondary networks 15-17. It is expected that the primary network 14 would cover a much a larger geographic region as compared to any of the secondary networks 15-17, but such a feature is not necessary.

In the exemplary embodiment depicted by FIG. 1, the primary network 14 is a wide area network (WAN), such as the Internet, and the secondary network 15 is a local area network (LAN) or a personal area network (PAN). As an example, the secondary network 15 may be implemented as a Wi-Fi network. However, in other embodiments, other types of networks may be used to implement either the primary network 14 or the secondary network 15.

As shown by FIG. 1, the secondary network 15 comprises at least one access point 28 for providing network access to user communication devices, such as device 25, within range of such access point 28. For simplicity, only one access point 28 is shown within the secondary network 15, but this network 15 may have any number of access points. The access point 28 comprises at least one transceiver (not specifically shown) for communicating with the device 25 and possibly other mobile communication devices (not specifically shown), and the access point 28 also comprises a network interface (not specifically shown), such as an Ethernet interface, to allow the access point 28 to communicate with network 14. The other secondary networks 16 and 17 may also comprise one or more access points, like the one shown in network 15, although such access points are not shown in FIG. 1 for simplicity of illustration.

Figure 2:
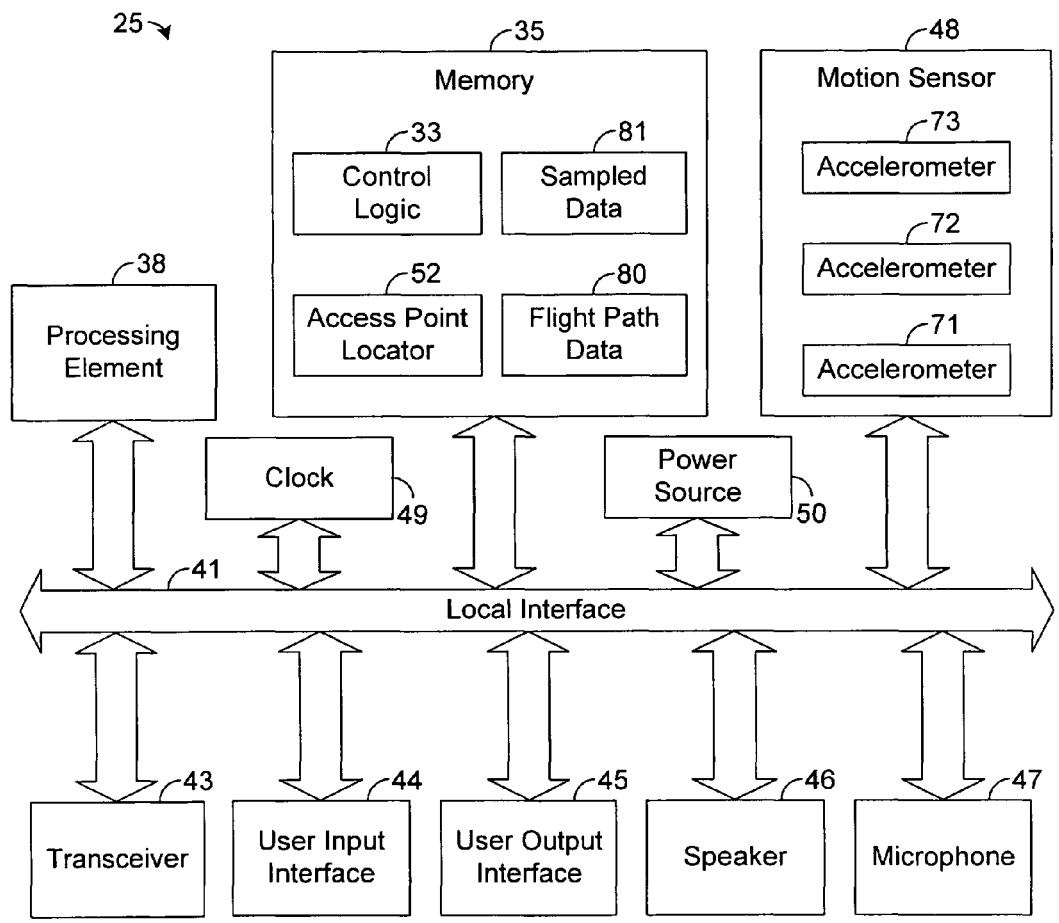
FIG. 2 is a block diagram illustrating a mobile communication device, such as is depicted in FIG. 1.

FIG. 2 depicts an exemplary embodiment of the mobile communication device 25. In this regard, the mobile communication device 25 has control logic 33 for generally controlling the operation of the device 25. The control logic 33 can be implemented in software, hardware, or a combination thereof. In the exemplary embodiment illustrated in FIG. 2, the control logic 33 is implemented in software and stored in memory 35 of the mobile communication device 25.

Note that the control logic 33, when implemented in software, can be stored and transported on any computer-readable medium for use by or in connection with an instruction execution apparatus, such as a processor, that can fetch and execute instructions. In the context of this document, a "computer-readable medium" can be any means that can contain, store, communicate, propagate, or transport a program for use by or in connection with an instruction execution apparatus. The computer readable-medium can be, for example but not limited to, an electronic, magnetic, optical, electromagnetic, infrared, or semiconductor apparatus or propagation medium.

The exemplary embodiment of the mobile communication device 25 depicted by FIG. 2 comprises at least one conventional processing element 38, such as a digital signal processor (DSP) or a central processing unit (CPU), that communicates to and drives the other elements within the device 25 via a local interface 41, which can include at least one bus. Furthermore, the device 25 comprises a transceiver 43 that transmits and receives wireless signals.

The device 25 also comprises a user input interface 44, such as a keypad, buttons, or switches that can be used by a user to provide inputs, a user output interface 45, such as a display screen (e.g., liquid crystal display), that can be used to provide output to a user, a speaker 46, and a microphone 47. The device 25 of FIG. 2 also comprises a motion sensor 48, which will be described in more detail hereafter, and a clock 49 for tracking time. In addition, a power source 50, such as a battery, provides electrical power to the components of the device 25.

In one exemplary embodiment, the transceiver 43 communicates digital data packets. As an example, the transceiver 43 may be Wi-Fi compliant and configured to communicate packetized information via Internet Protocol (IP). When transmitting a message, the transceiver 43 packetizes the data defining the message into at least one data packet. Each data packet is assigned a header that includes sufficient information for routing the message to its destination. For example, the header may identify the access point 28 that is to receive the packet as well as the identifier of a destination device to which the packet is ultimately destined. When receiving a message from the access point 28, the transceiver 43 extracts the data defining the message from one or more data packets and provides this data to one or more components of the device 25, such as speaker 46 or user output interface 45.

As shown by FIG. 2, the device 25 comprises an access point locator 52 that is configured to search for a suitable access point with which the transceiver 43 is to communicate. In this regard, the access point locator 52 analyzes the signals received by the transceiver 43 to determine whether any of the signals is a beacon from an access point. If a plurality of beacons from a plurality of access points are being received by the transceiver 43, the access point locator 52 analyzes the signals (e.g., compares signal strengths) to determine which access point is providing the best communication and selects this access point. Thereafter, the transceiver 43 communicates with the access point selected by the locator 52. Note that the access point selected for communication can change over time, particularly as the device 25 moves to new locations and, therefore, moves closer to some access points and farther from others. Any known or future-developed technique for selecting a suitable access point with which to communicate may be employed by the access point locator 52. In one exemplary embodiment, the access point locator 52 utilizes techniques for selecting access points and the transceiver 43 communicates in accordance with known Wi-Fi procedures and standards. For the purposes of illustration, it will be assumed hereafter that the access point 28 shown by FIG. 1 is selected for communication. However, as previously noted, the selected access point may change over time.

The access point locator 52 can be implemented in hardware, software, or a combination thereof. In one exemplary embodiment, as illustrated by FIG. 2, the access point locator 52 is implemented in software and stored in memory 35. The access point locator 52, when implemented in software, can be stored and transported on any computer-readable medium for use by or in connection with an instruction execution apparatus, such as a processor, that can fetch and execute instructions.

In one exemplary embodiment, the control logic 33 deactivates or puts to sleep the access point locator 52 and other components of the device 25, such as components 43-47, based on one or more factors. For example, the control logic 33 may deactivate such components after a predefined amount of time has elapsed since the last input by a user. Thus, if a user has not attempted to use the device 25 within the predefined amount of time, the components 43-47 and 52 are deactivated by the control logic 33 until the logic 33 determines when to activate or wake up these components 43-37 and 52, as will be described in more detail hereafter. The decision to deactivate any of the components 43-47 and 52 may be based on other factors in addition to or in lieu of user inputs. Further, it is possible for the logic 33 to deactivate less than all of the components 43-47 and/or 52 based on the anticipated usage of the device 25.

The control logic 33 is further configured to detect when a user is about to use the device 25 to send a message via transceiver 43. In other words, the logic 33 is configured to detect when it is likely that transmission of a message by the transceiver 43 is imminent. Upon making such a detection, the logic 33 activates or wakes up the access point locator 52 and/or other components that are deactivated, such as possibly any of the components 43-47. Thus, when it is determined that a user is about to transmit a message via transceiver 43, the access point locator 52 begins searching for a suitable access point 28 with which the transceiver 43 is to communicate the expected message. Accordingly, if the device 25 is within range of a suitable access point 28, the transceiver 43 can transmit the message upon receiving the message or shortly thereafter. Therefore, having the access point locator 52 deactivated prior to the logic 33 detecting imminent transmission of the message conserves power up to at least the point that the locator 52 is awakened without significantly affecting the performance of the device 25 in an adverse manner.

There are a variety of ways that the logic 33 can detect imminent transmission of a message. For example, an input received via user input interface 44 may indicate that the user is about to utilize the device 25 to transmit a message. Thus, the logic 33 may be configured to awaken the access point locator 52 and/or other components of the device 25 in response to a user input received via interface 44.

However, in one exemplary embodiment, the control logic 25 awakens the access point locator 52 and/or other components of the device 25 based on the motion sensor 48. In this regard, the motion sensor 48 detects movement of the device 25, and the logic 33 monitors the motion sensor 48 to determine when the device 25 has been moved in a manner to suggest that a user is about to use the device 25. As an example, the control logic 33 may determine an orientation of the device 25, based on data from the sensor 48, and determine when the device 25 has been oriented in a manner to suggest that the device 25 is about to be used for communication. In this regard, depending on the configuration of the device 25, it might be likely that many users will hold the device 25 at a certain angle or a relatively small range of angles when using the device 25, such as looking at a display screen or keypad of the device 25 or speaking into the microphone 47. Thus, when the control logic 33 detects, based on data from the motion sensor 48, that the device 25 has been moved to such an angle or range of angles, the logic 33 may determine that transmission of a message is imminent and may awaken the access point locator 52 and/or other components of the device 25. Other techniques for determining when to awaken the access point locator 52 and/or other components of the device 25 are also possible.

Indeed, in another example, the magnitude of movement may indicate whether usage of the device 25 is imminent. In this regard, a large movement magnitude may indicate that a user has grasped the device 25 and/or is moving the device 25 into a new position for using it. In such an example, the motion sensor 48 may comprise at least one accelerometer 71-73 for detecting accelerations of the device 25. If a measured acceleration or a measured average acceleration over a predefined time period, such as about 1 or 2 seconds, exceeds a threshold, then the control logic 33 may be configured to awaken the access point locator 52 and/or other components of the device 25.

Figure 3:
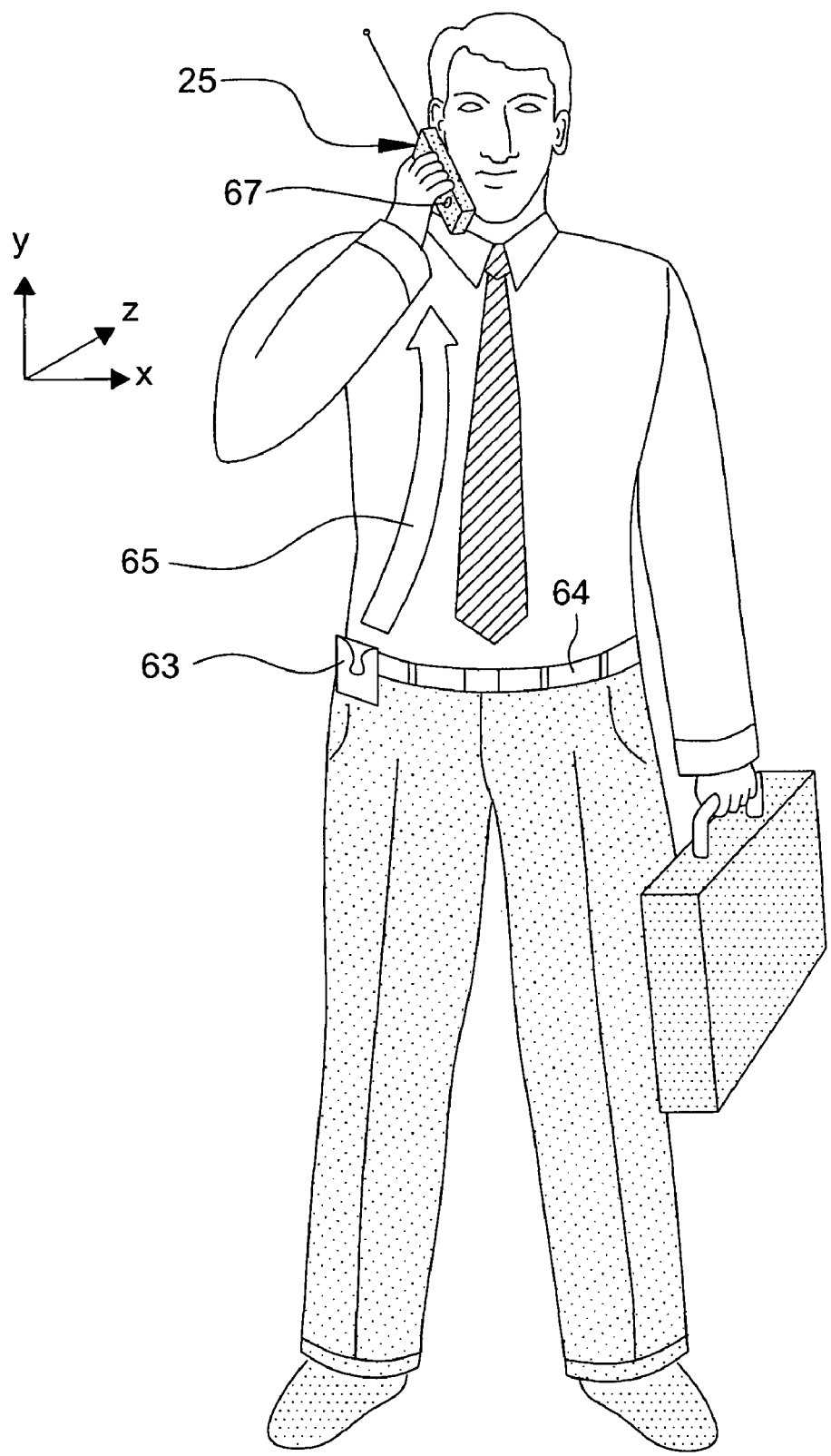
FIG. 3 is a diagram illustrating a user that has moved a mobile communication device, such as is depicted in FIG. 1, to a position enabling the user to use the mobile communication device.

In another example, the motion sensor 48 is configured to sense information indicative of a flight path of the device 25 as the device is being moved, and the control logic 33 is configured to determine whether usage of the device 25 is imminent based on the sensed flight path. In this regard, certain flight paths may indicate that a user has grabbed the device from a location of storage, such as a clothing pocket, a holding apparatus for holding the device 25, etc., and has moved the device 25 to a new position and/or orientation indicating that usage of the device 25 is likely imminent. For example, a sensed flight path may indicate that the device 25 has been moved in a manner similar to that which would be expected if the device 25 were grabbed from a clothing pocket and moved to a position in which the user could observe a display screen or a keypad of the device 25 or other position indicative of imminent use. FIG. 3 depicts one example in which a user has grabbed device 25 from a holding apparatus 63 worn on a belt 64 of the user and moved the device 25 to an expected orientation and position when the user is likely to use the device 25 to send a message. In the example shown by FIG. 3, the user has moved the device 25 along a flight path 65 to a position adjacent his face so that the user can speak directly into the microphone 47 (FIG. 2). However, depending on the configuration of the device 25, other orientations and positions may indicate imminent usage of the device 25 in other examples. When the motion sensor 48 senses a flight path indicating that the device 25 has been moved to an orientation and/or position for which usage of the device 25 is imminent, the control logic 33 awakens the access point locator 52 and/or other components of the device 25 based on the sensed flight path.

In an embodiment that senses flight path information, the motion sensor 48 can be configured to detect one, two, or three degrees of movement. Generally, better results can be obtained by detecting more degrees of movements. In one exemplary embodiment, the motion sensor 48 comprises three accelerometers 71-73, as shown by FIG. 2. Referring to FIG. 3, accelerometer 71 detects accelerations along the x-axis, and accelerometer 72 detects accelerations along the y-axis. Further, accelerometer 73 detects accelerations along the z-axis, and the x, y, and z-axes are all orthogonal to each other. Thus, the data from the accelerometers 71-73 indicates three dimensional (3D) movement. In other examples, 3D movement may be indicated by other sensors or combinations of sensors. For example, it is well known that two accelerometers and a compass may be used to determine 3D movement. In yet other examples, only 2 dimensional (2D) or one dimensional (1D) movement may be detected by the sensor 48. For example, only two accelerometers 71 and 72 may be employed to detect 2D movement, or only one accelerometer 71 may be employed to detect 1D movement. For illustrative purposes, it will be assumed hereafter that the sensor 48 employs the three accelerometers 71-73 shown by FIG. 2 to enable detection of 3D movement, but it should be apparent that other types and/or numbers of movement detection devices may be used in other embodiments.

For purposes of illustration, assume that a user moves the device 25 from its holding apparatus 63 to near his mouth, as depicted by FIG. 3, just before speaking a message that is to be transmitted by the transceiver 43 (FIG. 2). The following is a description of an exemplary method of operating the device 25 in detecting this movement for the purpose of awakening the access point locator 52 and/or other components of the device 25. It should be apparent to one of ordinary skill in the art, after reading the present disclosure, that similar techniques may be used for detecting other movements that may indicate imminent usage of the device 25.

As shown by FIG. 2, flight path data 80 is stored in memory 35. The flight path data 80 indicates the expected data output by the accelerometers 71-73 as the user is moving the device 25 along flight path 65. The flight path data 80 may be pre-programmed into the device 25 by the manufacturer. For example, the manufacturer may anticipate that movement along the flight path 65 likely indicates that a user is about to use the device 25. Thus, the manufacturer may have a user or a robotic arm to move the device 25 in a manner similar to flight path 65. As the device 25 is being moved, the accelerometers 71-73 are periodically sampled (e.g., every microsecond), and, in various embodiments, the sampled data may be recorded or saved thereby defining sampled data. This sampled data is stored to memory 35 as the flight path data 80. Thus, if the user of FIG. 3 moves the device 25 in the flight path 65 and if the accelerometers 71-73 are sampled at a similar rate as was used to define the flight path data 80, then it is to be expected that the sampled data would be similar to the flight path data 80 previously stored in the memory 35.

Accordingly, the control logic 33 can be configured to repetitively sample the accelerometers 71-73 while the user is moving the device 25 along flight path 65 thereby defining sampled data 81. The control logic 33 may then compare the sampled data 81 to the flight path data 80 stored in memory 35. If the control logic 33 determines that the sampled data 81 sufficiently resembles the flight path data 80, the logic 33 may determine that the device 25 has been moved in a manner that suggests usage of the device 25 is imminent and will, therefore, awaken the access point locator 52 and/or other components of the device 25.

There are a variety of techniques that may be used to determine whether the sampled data 81 sufficiently resembles the flight path data 80. In one example, the control logic 33 vector subtracts the sampled data 81 from the flight path data 80, and the differences in such data 80 and 81 are vector summed to provide a vector summation value indicative of the total difference between the sampled data 81 and the flight path data 80. The control logic 33 then compares the vector summation value to a threshold. If the vector summation value is below the threshold, then the control logic 33 determines that the sampled data 81 sufficiently resembles the flight path data 80 and that usage of the device 25 is, therefore, imminent. However, if the vector summation value is equal to or greater than the threshold, then the control logic 33 determines that the sampled data 81 does not sufficiently resemble the flight path data 80, and the control logic 33, therefore, does not awaken the access point locator 52 and/or other components of the device 25 based on the data 81.

In another exemplary embodiment, the control logic 33 vector sums the sampled acceleration values of the sampled data 81 and vector sums the sampled acceleration values of the flight path data 80. The control logic 33 then subtracts the vector summation of the sampled data 81 from the vector summation of the flight path data 80, and the difference is compared to a threshold. If the difference is below the threshold, then the control logic 33 determines that the sampled data 81 closely resembles the flight path data 80 and that usage of the device 25 is, therefore, imminent. However, if the vector summation value is equal to or greater than the threshold, then the control logic 33 determines that the sampled data 81 does not closely resemble the flight path data 80, and the control logic 33, therefore, does not awaken the access point locator 52 and/or other components of the device 25 based on the data 81.

In the above examples, the comparison of the sampled data 81 and the flight path data 80 takes into account the positional changes of the device 25 in space (e.g., changes in x, y, and/or z-coordinates) as well as orientation changes of the device (e.g., rotations of the device 25 about the x, y, and/or z-axis). In this regard, the more similar that the positional changes of the device 25 are to the positional changes of the device used to create the flight path data 80, then the more likely it is that the sampled data 81 will closely resemble the flight path data 80. Further, the more similar that the rotational changes of the device 25 are to the rotational changes of the device used to create the flight path data 80, then the more likely it is that the sampled data 81 will closely resemble the flight path data 80. Thus, positional changes and rotational changes may both be factors in the determination as to whether the access point locator 52 and/or other components of the device 25 are to be activated in response to movement of the device 25.

However, considering both positional changes and rotational changes is not necessary. For example, the flight path data 80 may indicate the total expected positional change of the device 25 for a movement indicating imminent usage, and the control logic 33 may be configured to calculate, based on the sampled data 81, the total positional change of the device 25 from the start of movement to the end of movement. Thus, the comparison of the sampled data 81 and the flight path data 80 in such an example only accounts for positional changes and does not account for rotational changes. Alternatively the flight path data 80 may indicate the total expected rotational change of the device 25 for a movement indicating imminent usage, and the control logic 33 may be configured to calculate, based on the sampled data 81, the total rotational change of the device 25 from the start of movement to the end of movement. Thus, the comparison of the sampled data 81 and the flight path data 80 in such an example only accounts for rotational changes and does not account for positional changes. Various other ways for comparing the flight path data 80 and the sampled data 81 are also possible.

Note that it is unnecessary for the device 25 to be used by a manufacturer to define the flight path data 80 as described above. For example, another device having three accelerometers, similar to accelerometers 71-73, may be used to define the data 80 by moving such device and sampling the accelerometers. The resulting flight path data 80 is then downloaded from the other device to the device 25 described herein.

Furthermore, the flight path data 80 may define several different flight paths that each indicate imminent usage of the device 25 if a similar flight path is detected via sensor 48. In such an example, the control logic 33 may be configured to compare the sampled data 81 to each of the defined flight paths and to awaken the access point locator 52 and/or other components of the device 25 if the sampled data 81 is determined to closely resemble any of the defined flight paths.

In addition, it is possible for the device 25 to "learn" one or more flight paths (e.g., specific to a particular user) that indicate likely imminent usage of the device 25 and to define at least a portion of the data 80 after the device 25 has been sold by the manufacture. In this regard, the control logic 33 may record the data from the sensor 48 for various movements of the device 25. In such embodiments, if a particular movement immediately precedes the transmission of a message by the user, the control logic 33 adds the flight path information resulting from the movement to the flight path data 80. Thus, if the device 25 is similarly moved in the future while the access point locator 52 is deactivated, the control logic 33 determines that usage of the device 25 is imminent based on the movement and awakens the locator 52.

In one exemplary embodiment, the user can provide an input for indicating to the control logic 33 when a movement indicative of imminent usage is to be learned. For example, the user may submit, via user input interface 44 (FIG. 2), a command for instructing the control logic 33 to learn a flight path for data 80. The user may then move the device 25 in a manner that indicates imminent usage, such as moving the device 25 from the holding apparatus 63 to the position shown in FIG. 3. During this move, the control logic 33 may periodically sample the motion sensor 48 and store this sampled data in memory 35 as at least part of the flight path data 80. Various other ways of defining the flight path data 80 are also possible.

In another exemplary embodiment, the sensor 48 comprises a contact switch 67 (FIG. 3) for assisting in the determination as to whether usage of the device 25 is imminent and, therefore, whether the access point locator 52 and/or other components of the device 25 are to be activated. In this regard, the contact switch 67 detects whether the device 25 is positioned against a surface of another object, such as the holding apparatus 63 and provides an output signal indicative of the whether contact with the other object is sensed by the switch 67. For example, the contact switch 67 may be located on a side of the mobile communication device 25 that abuts the holding apparatus 63 when the apparatus 63 is holding the device 25. In such an example, the contact switch 67 senses contact with the holding apparatus 63. Moreover, moving the device 25 away from the object (e.g., apparatus 63) may indicate that the device 25 is about to be used for communication. Thus, in such embodiments, upon detecting, based on the state of the contact switch 67, that the device 25 has been moved away from the object, the control logic 33 activates the access point locator 52 and/or other components.

In other embodiments, the information from the contact switch 67 is used as a factor in the overall determination as to whether usage of the device 25 is imminent. For example, the control logic 33 may ignore movements detected via the accelerometers 71-73 unless the control logic 33 determines, based on the contact switch 67, that the device 25 has been moved away from an object, such as the holding apparatus 63. If this occurs, then the control logic 33 compares the detected movement to the flight path data 80, as described above, to determine whether usage of the device 25 is imminent. Accordingly, at least some false detections of imminent usage may be prevented.

In the embodiments described above, the motion sensor 48 is utilized to determine when usage of the device 25 is imminent and, therefore, whether the access point locator 52 and/or other components of the device 25 are to be activated. However, the motion sensor 48 may be similarly used to determine when usage of the device 25 is not likely to occur in the near future and to deactivate the access point locator 52 and/or other components of the device 25. For example, in some embodiments, inserting the device 25 into the holding apparatus 63 indicates that the user has, at least temporarily, stopped using the device 25. Thus, based on the motion sensor 48, the control logic 33 may determine when the device 25 has been moved to an orientation and/or position indicating that the device 25 has been inserted into the holding apparatus 63 and, in response, deactivate the access point locator 52 and/or other components of the device 25. Thereafter, the control logic 33 may awaken the access point locator 52 and/or other deactivated components of the device 25 when the device 25 is moved in a manner that indicates usage is imminent.

In some embodiments, the flight path data 80 indicates one or more flight paths suggesting that usage of the device 25 is not likely to occur in the near future. For example, the flight path data 80 may define a flight path likely experienced by the device 25 when it is moved to the holding apparatus 63 or other storage location. Thus, using techniques similar to those described above for determining whether a flight path sensed via sensor 48 closely resembles a flight path defined by data 80, the control logic 33 may determine when a movement of the device 25 closely resembles the flight path suggesting that usage of the device 25 is not imminent. If the sensed flight path closely resembles the defined flight path, then the control logic 33 may deactivate or put to sleep the access point locator 52 and/or other components of the device 25.

Moreover, by controlling the activation state of the access point locator 52 and/or other components of the device 25 based on movement of the device 25, as determined via a motion sensor 48, the control logic 33 reduces the power consumption of the device 25 during periods in which usage of the device 25 is not imminent, thereby conserving power resources.

Figure 4:
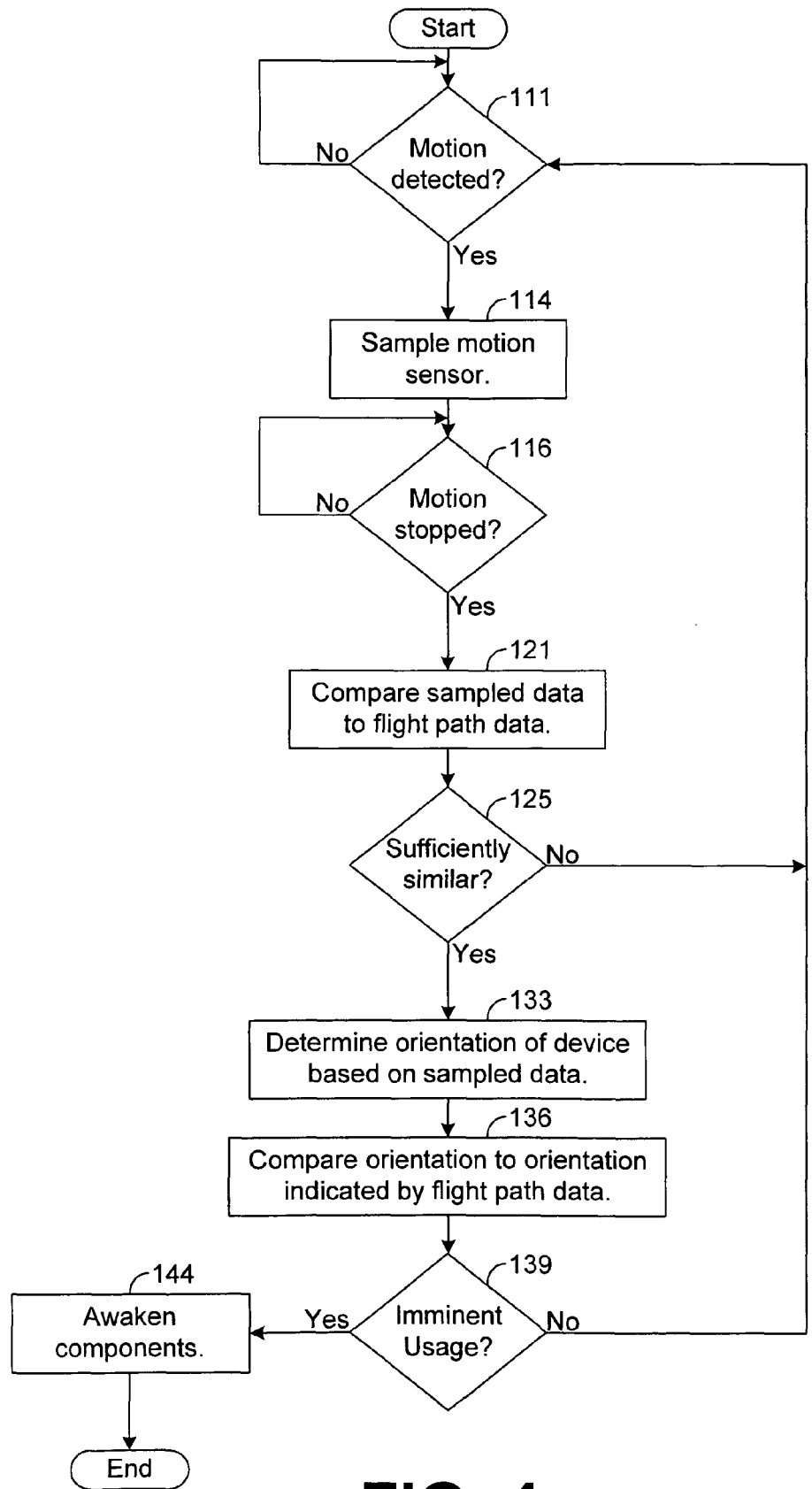
FIG. 4 is a flow chart illustrating an exemplary method for embodiments of operation of a mobile communication device, such as is depicted in FIG. 1.

To further illustrate various principles of the present disclosure, an exemplary method of embodiments of operation of the device 25 will be described in more detail hereafter with reference to FIG. 4. In the exemplary embodiment described below, it will be assumed that the motion sensor 48 comprises the three accelerometers 71-73 described above and that each of these accelerometers detects accelerations along a different axis.

Initially, the flight path data 80 is defined and stored in memory 35. The flight path data 80 is defined by simulating a movement indicative of imminent usage of the device 25. For example, the user may grab the device 25 from the holding apparatus 63 and move the device 25 to the position shown by FIG. 3. During this movement, the control logic 33 monitors the motion sensor 48. When the data from the sensor 48 indicates that the motion has been started (e.g., the device 25 has been grabbed), the logic 33 begins sampling the sensor 48 periodically (e.g., every microsecond) and records each sample until the data from the sensor 48 indicates that motion has stopped. The control logic 33 then vector sums all of the samples to provide a vector summation indicative of the total movement detected by sensor 48. In some embodiments, the control logic 33 generates a vector summation ($S_1$) defined by the following equation:

$$S_1 = x_1 \vec{i} + y_1 \vec{j} + z_1 \vec{k}$$

where $x_1$ represents the total summation of accelerations in the x-direction, $y_1$ represents the total summation of accelerations in the y-direction, and $z_1$ represents the total summation of accelerations in the z-direction. The flight path data 80 also comprises a threshold value (TH). The threshold value may be selected by a user (e.g., the manufacturer, purchaser, etc.) and stored into the memory 35.

At some point, the control logic 33 deactivates the access point locator 52 as well as the transceiver 43. This may be done in response to user input or may be automatically performed by the control logic 33 based on some factor, such as the amount of time that has elapsed since the last use of the device 25 by the user. Further, as described above, in some embodiments, the decision to deactivate the access point locator 52 may be performed based on movements of the device 25. While deactivated, the access point locator 52 and the transceiver 43 do not consume power from the power source 50.

After deactivating the access point locator 52 and the transceiver 43, the control logic 33 monitors the data from the motion sensor 48. As shown by block 111 of FIG. 4, the control logic 33 determines whether motion is detected by the sensor 48 such that the user may be initiating movement of the device 25 to a position of use. In this regard, the control logic 33 calculates a magnitude of the accelerations detected by the sensor 48 and compares the magnitude to a predefined threshold. If the magnitude exceeds the threshold, then the logic 33 makes a "yes" determination in block 111. Otherwise, the logic 33 makes a "no" determination.

If motion is detected in block 111, the control logic 33 periodically (e.g., every microsecond) samples and records the data from the motion sensor 48, thereby defining the sampled data 81, until the data from the sensor 48 indicates that motion has stopped, as shown by blocks 114 and 116. Once the motion has stopped, the control logic 33 compares the sampled data 81 to the flight path data 80 to determine if the detected motion indicates that usage of the device 25 is imminent, as shown by block 121.

In this regard, the control logic 33 vector sums all of the samples to provide a vector summation indicative of the total movement detected by sensor 48. In some embodiments, the control logic 33 generates a vector summation ($S_2$) defined by the following equation:

$$S_2 = x_2 \vec{i} + y_2 \vec{j} + z_2 \vec{k}$$

where $x_2$ represents the total summation of accelerations in the x-direction, $y_2$ represents the total summation of accelerations in the y-direction, and $z_2$ represents the total summation of accelerations in the z-direction. The control logic 33 then subtracts $S_2$ from $S_1$ to generate a vector (V) defined by the following equation:

$$V = (x_1 - x_2) \vec{i} + (y_1 - y_2) \vec{j} + (z_1 - z_2) \vec{k}$$

The control logic 33 calculates the magnitude of V and compares the magnitude to the threshold (TH). If the magnitude is below TH, then the control logic 33 determines that the detected motion sufficiently resembles that indicated by the flight path data 80 and, therefore, makes a "yes" determination in block 125. If the magnitude is not below TH, then the control logic 33 makes a "no" determination in block 125 and returns to block 111.

If desired, the control logic 33 may activate the access point locator 52 and the transceiver 43 in response to a "yes" determination in block 125. In some embodiments, the orientation of the device 25 may be a particularly good indicator to prevent false detection's of imminent usage of the device 25. In such embodiments, the logic 33 further analyzes the orientation changes of the device 25 during the sensed movement before activating the access point locator 52 and the transceiver 43. Note that the determination in block 125, in such embodiments, is based both on similarity in positional changes and rotational changes of the device 25. In other embodiments, a determination of similarity may be made by separately analyzing the positional changes or the rotational changes.

In some embodiments, in block 133, the control logic 33 determines the orientation change of the device 25 by calculating, based on the sampled data 81, the total rotational change of the device 25 along each of the x, y, and z-axes. The control logic 33 then compares these calculated rotational changes to the rotational changes along the same axes indicated by the flight path data 80, as shown by block 136. The rotational changes of the flight path data 80 may be pre-calculated and stored in the memory 35 or may be calculated by the control logic 33 at run time. If the calculated rotational changes of the device 25 are within a specified range of the rotational changes indicated by flight path data 80, then the control logic 33 determines, in block 139, that usage of the device 25 is imminent. Otherwise, the control logic 33 makes a "no" determination in block 139 and returns to block 111.

If usage of the device 25 is imminent, then the control logic 33 activates the access point locator 52 and the transceiver 43, as indicated by block 144. Thus, the transceiver 43 is powered up and begins receiving signals, and the access point locator 52 monitors these signals. If the signals include a beacon from at least one access point, the access point locator 52 identifies an access point 28 with which the device 25 is to communicate. Once the access point 28 is identified, a message may be transmitted by the transceiver 43 over the secondary network 15 and/or primary network 14 via the identified access point 28. Accordingly, if the movement sensed via the motion sensor 48 indeed indicates that a user is about to use the device 25 to transmit a message, then the user is quickly provided with access to the network 14 without the user having to intentionally provide manual inputs for activating the access point locator 52 or the transceiver 43.

The invention claimed is:

1. A mobile communication device, comprising:
a transceiver configured to communicate wireless signals;
memory holding prestored data indicative of an expected flight path of the device, the prestored data comprising a plurality of data values each representative of at least one of position and orientation of the device at a periodic interval along the expected flight path; a motion sensor;
processor configured to sample the motion sensor at the periodic interval and generate sampled data indicative of the at least one of position and orientation of the device along an actual flight path of the device; and
processor configured to perform a comparison of the actual flight path to the expected flight path and to control an activation state of at least one component of the mobile communication device based on the comparison, wherein the comparison comprises:

vector subtracting the sampled data from the prestored data to form difference data indicative of a difference between the actual flight path and the expected flight path, vector summing the difference data to form a vector summation value, and comparing the vector summation value to a predetermined threshold.

2. The device of claim 1, wherein the processor is configured to determine an orientation of the mobile communication device based on the data from the motion sensor and to control the activation state of the at least one component based on the determined orientation.

3. The device of claim 1, wherein the motion sensor comprises at least one accelerometer.

4. The device of claim 1, wherein the at least one component comprises an access point locator configured to identify an access point for providing the transceiver with access to a network.

5. The device of claim 1, wherein the motion sensor comprises a contact switch.

6. The device of claim 5, wherein the processor is configured to sample the motion sensor based on a state of the contact switch.

7. The device of claim 1, further comprising:
processor configured to sample the motion' sensor at the periodic interval and record second prestored data indicative of a second expected flight path of the device defined by a user of the device, wherein the device is further configured to perform a comparison of the actual flight path to the second expected flight path and control the activation state of the at least one component based on the comparison.

8. A method for use in mobile communication devices, comprising:
periodically sampling with a processor a motion sensor while a mobile communication device is moving thereby defining sampled data indicative of an actual flight path of the mobile communication device;
comparing with the processor the sampled data to prestored data indicative of an expected flight path of the mobile communication device, wherein the comparing comprises
calculating a vector sum of the sampled data,
calculating a vector sum of the prestored data,
subtracting the sampled data vector sum from the prestored data vector sum and comparing the difference to a threshold; and
activating by the processor at least one component of the mobile communication device based on the comparing.

9. The method of claim 5, further comprising determining an orientation of the mobile communication device based on the sampled data, wherein the activating is based on the determining.

10. The method of claim 5, further comprising detecting acceleration of the mobile communication device via the motion sensor.

11. The method of claim 5, further comprising sensing whether the mobile communication device is in contact with a holding apparatus, wherein the sampling is disabled when the device is in contact with the holding apparatus and enabled when the device is positioned away from the holding apparatus.

12. The method of claim 5, wherein the at least one component comprises an access point locator, and wherein the method further comprises:
receiving at least one beacon from at least one access point; and selecting an access point, via the access point locator, based on the at least one beacon.

13. The method of claim 5, further comprising determining whether usage of the mobile communication device is imminent based on the comparing.

14. A mobile communication device, comprising:

a transceiver configured to communicate wireless signals;

memory holding prestored data indicative of an expected flight path of the device, the prestored data comprising a plurality of data values each representative of at least one of position and orientation of the device at a periodic interval along the expected flight path;

a motion sensor;

processor configured to sample the motion sensor at the periodic interval and generate sampled data indicative of the at least one of position and orientation of the device along an actual flight path of the device; and processor c configured to perform a comparison of the actual flight path to the expected flight path and to control an activation state of at least one component of the mobile communication device based on the comparison, wherein the comparison comprises calculating a vector sum of the sampled data, calculating a vector sum of the prestored data, subtracting the sampled data vector sum from the prestored data vector sum and comparing the difference to a threshold.

* * * * *

UNITED STATES PATENT AND TRADEMARK OFFICE
CERTIFICATE OF CORRECTION

PATENT NO. : 7,881,749 B2
APPLICATION NO. : 11/528957
DATED : February 1, 2011
INVENTOR(S) : Paul E. Hiles Page 1 of 1

It is certified that error appears in the above-identified patent and that said Letters Patent is hereby corrected as shown below:

In column 12, line 24, in Claim 7, delete "motion'" and insert -- motion --, therefor.

In column 12, line 50, in Claim 9, delete "claim 5," and insert -- claim 8, --, therefor.

In column 12, line 54, in Claim 10, delete "claim 5," and insert -- claim 8, --, therefor.

In column 12, line 57, in Claim 11, delete "claim 5," and insert -- claim 8, --, therefor.

In column 12, line 63, in Claim 12, delete "claim 5," and insert -- claim 8, --, therefor.

In column 13, line 3, in Claim 13, delete "claim 5," and insert -- claim 8, --, therefor.

In column 14, line 5, in Claim 14, after "processor" delete "c".

Signed and Sealed this
Seventeenth Day of May, 2011

David J. Kappos
*Director of the United States Patent and Trademark Office*